Jan. 25, 1955 A. L. HAMMOND 2,700,698
CHROMINANCE CHANNEL CIRCUITS OR THE LIKE
Filed Feb. 1, 1954
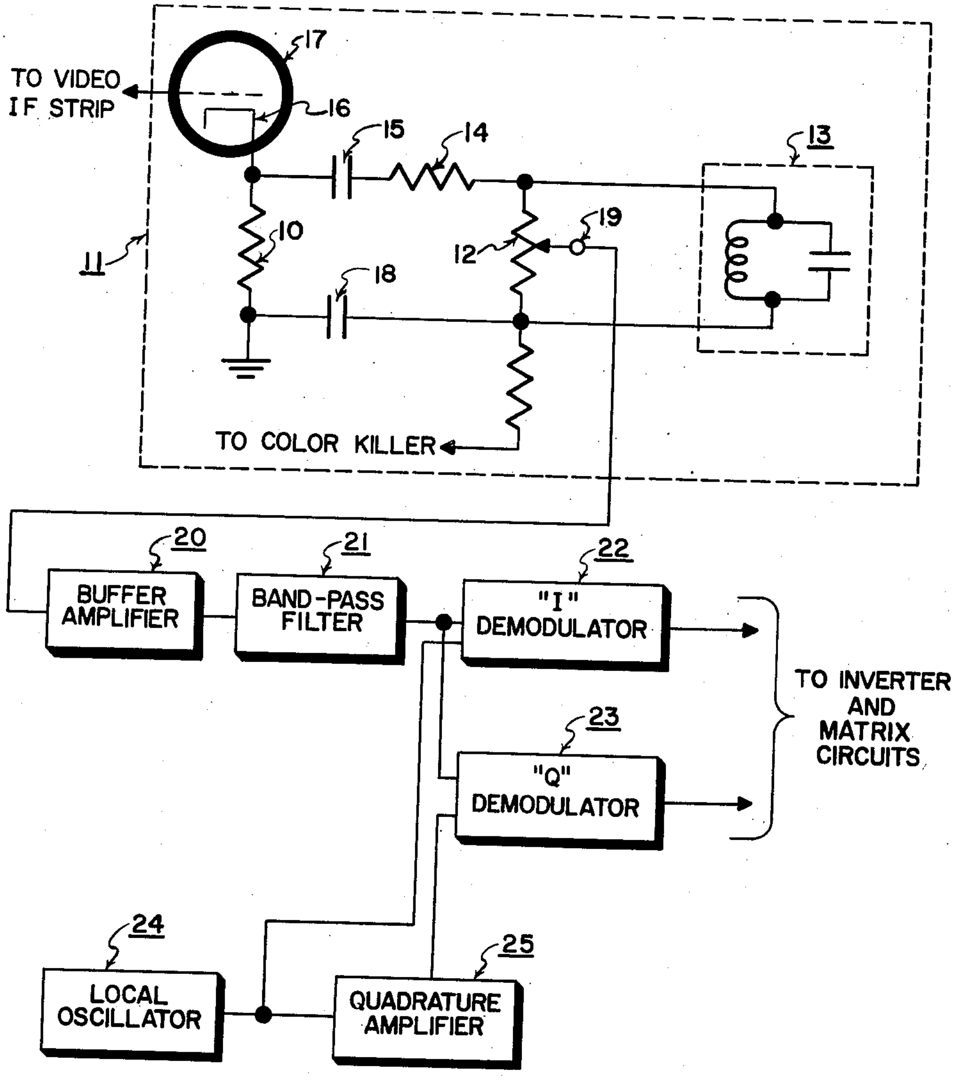
ARTHUR L. HAMMOND
*INVENTOR.*
*BY* [signature]
HIS ATTORNEY United States Patent Office 2,700,698

Patented Jan. 25, 1955

2,700,698

CHROMINANCE CHANNEL CIRCUITS OR THE LIKE

Arthur L. Hammond, Los Angeles, Calif., assignor to Hoffman Radio Corporation, a corporation of California Application February 1, 1954, Serial No. 407,387

2 Claims. (Cl. 178—5.4)

This invention is related to color television receiving apparatus and more particularly to an improved chrominance channel circuit for employment in such apparatus.

In the past, many attempts have been made to design a satisfactory chrominance channel circuit to detect and prepare the chrominance signals for matrixing and subsequent routing to the image reproducing device, or videoscope. Invariably certain problems are encountered which render chrominance channel circuits presently in use deficient in some respect. The principal difficulty lies in the fact that the conventional band-pass filters employed in such chrominance circuits produce a phase shift in the chroma signals being received, and, indeed, a different delay or advance in phase for each separate side band frequency. This undesirable phenomenon prevents synchronization of the chroma signals with the black-and-white signals at the videoscope.

Therefore, it is an object of this invention to provide an improved chrominance channel circuit for employment in color television receiving apparatus.

It is a further object of this invention to provide an improved chrominance channel circuit having means to compensate for phase shifts experienced by the chroma signals upon their passage through the chrominance channel circuit.

According to this invention the output signal of a video amplifier stage is taken from a potentiometer shunting, in combination with a parallel resonant circuit tuned to the chroma subcarrier, a cathode load resistor in the video amplifier circuitry. This video output signal is subsequently passed through a buffer amplifier stage to a band-pass filter which selects the chroma subcarrier and side-bands, these frequencies being fed to the "Q" and "I" demodulator stages together with an output signal of a local oscillator stage which is directly connected to the "I" demodulator stage and is connected through a quadrature amplifier stage to the "Q" demodulator stage. The central feature of this invention lies in the insertion of a parallel resonant circuit in that portion of the video amplifier stage leading to the chominance channel to introduce phase shifts in the chroma side-band frequencies which will be equal and opposite to the phase shifts produced in these side-bands by virtue of the characteristics of the chroma band-pass filter.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which the sole figure is a diagram of a chrominance channel circuit according to this invention.

In the sole figure, cathode load resistor 10 in video amplifier stage 11 is shunted by potentiometer 12 and parallel resonant circuit 13; one end of potentiometer 12 and one end of tuned circuit 13 are connected through isolating resistor 14 and capacitor 15 to cathode 16 of vacuum tube 17; the other end of potentiometer 12 and of tuned circuit 13 are connected through capacitor 18 to ground. The output signal from video amplifier stage 11 as developed across potentiometer 12 is taken from tap 19 of potentiometer 12 and fed to buffer amplifier stage 20 which, in turn, is connected through band-pass filter 21 to "I" demodulator stage 22 and also "Q" demodulator stage 23. Local oscillator stage 24 is directly connected to "I" demodulator stage 22, and is also connected through quadrature amplifier stage 25 to "Q" demodulator stage 23. The output signals from "I" demodulator stage 22 and "Q" demodulator stage 23 are subsequently fed to the inverter and matrixing section of the receiver.

The circuit of the sole figure operates as follows. It is known that the conventional constant-K type band-pass filter produces a phase shift in signals passing through it, producing a phase advancing increment as the signal frequency decreases and producing a phase retarding increment as the signal frequency increases. Hence, if band-pass filter 21 is selected to be symmetrical about the chroma subcarrier frequency, it is seen that the subcarrier lower side-band frequencies will experience a phase advance, whereas the upper side-band frequencies will experience a phase delay.

But it is also known that a parallel-tuned circuit produces a phase shift in signals passing through it, producing a phase retarding increment as the signal frequency decreases and producing a phase advancing increment as the signal frequency increases.

These counter-phenomena are relied upon to effect the desired result in the circuitry of the sole figure. Resonant circuit 13 introduces phase shifts in the output signals taken from potentiometer 12 of video amplifier stage 11. Upper chroma side-band frequencies experience phase advances, and lower side-band frequencies experience phase delays. The video information is subsequently passed from video amplifier stage 11 through buffer amplifier stage 20, an isolation stage, to band-pass filter 21 which selectively passes the chroma information signals to the chrominance channel of the receiver. By reason of its characteristics, band-pass filter 21 also introduces phase shifts in the chroma side-bands. Upper chroma side-band frequencies this time experience phase delays, and lower side-band frequencies experience phase advances, and, as resonant circuit 13 may be so chosen as to have equal and opposite characteristics of band-pass filter 21, the effects of resonant circuit 13 and filter 21 upon the chroma side-bands will cancel each other, and the chroma information is effectively restored to its original phase.

It is accordingly seen that all frequencies constituting the upper and lower side-bands of the chroma subcarrier will be restored in phase to their original condition before passing through the chrominance channel by virtue of this channel's phase-shift self-compensating feature described above.

From the above description of the present invention, it is seen that a new and useful chrominance channel circuit has been designed for use in color television receivers which will reduce to a minimum phase distortion of the chroma signals resulting from the conventional band-pass filter employed in the chrominance channel, and consequential improvement in the overall synchronization of the color impulses with the black-and-white signals at the videoscope.

While particular embodiment of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A chrominance channel circuit for employment in color television receiving apparatus comprising, in combination, a video amplifier stage with a vacuum tube having at least anode, cathode, and control electrodes, a potentiometer having a voltage tap, and a parallel resonant circuit, said potentiometer and said parallel resonant circuit being connected between said cathode of said vacuum tube and the reference potential; a buffer amplifier stage having an input circuit and an output circuit, said voltage tap of said potentiometer being connected to said input circuit of said buffer amplifier stage; a band-pass filter, a first demodulator stage having a first input circuit, a second input circuit, and an output circuit, and a second demodulator stage having a first input circuit, a second input circuit, and an output circuit, said output circuit of said buffer amplifier stage being connected through said band-pass filter to said first input circuit of said first demodulator stage and also to said first input circuit of said second demodulator stage; a local oscillator stage and a quadrature amplifier stage, said local oscillator stage being directly connected to said second input circuit of said first demodulator stage, and said local oscillator stage also being connected through said quadrature amplifier stage to said second input circuit of said second demodulator stage.

2. A chrominance channel circuit for employment in color television receiving apparatus comprising, in combination, a video amplifier stage with a vacuum tube having at least anode, cathode, and control electrodes, a parallel resonant circuit, a potentiometer having a voltage tap, a resistor, a first capacitor, and a second capacitor, one end of said parallel resonant circuit and one end of said potentiometer being connected through said resistor and said first capacitor to said cathode of said vacuum tube, and the other ends of said tuned circuit and said potentiometer being connected through said second capacitor to the reference potential; a buffer amplifier stage having an input circuit and an output circuit, said voltage tap of said potentiometer being connected to said input circuit of said buffer amplifier stage; a band-pass filter, a first demodulator stage having a first input circuit, a second input circuit, and an output circuit, and a second demodulator stage having a first input circuit, a second input circuit, and an output circuit, said output circuit of said buffer amplifier stage being connected through said band-pass filter to said first input circuit of said first demodulator stage and also to said first input circuit of said second demodulator stage; a local oscillator stage and a quadrature amplifier stage, said local oscillator stage being connected to said second input circuit of said first modulator stage, and through said quadrature amplifier stage to said second input circuit of said second demodulator stage.

References Cited in the file of this patent

UNITED STATES PATENTS

| | | |
|---|---|---|
| 2,227,902 | Hahnle | Jan. 7, 1941 |
| 2,241,615 | Plebanski | May 13, 1941 |
| 2,342,638 | Bode | Feb. 29, 1944 |
| 2,411,423 | Guptill | Nov. 19, 1946 |